Patented Oct. 17, 1933

1,930,474

UNITED STATES PATENT OFFICE 1,930,474

PROCESS FOR MAKING WATER SOLUBLE DISINFECTANTS

Paul Gödrich, Munich, Germany, assignor to Goedrich Chemical Company, New York, N. Y., a corporation of Delaware No Drawing. Application July 7, 1927, Serial No. 204,153, and in Germany July 12, 1926

9 Claims. (Cl. 167—31)

It is well known, that cresols, thymols, salol and the like may be dissolved in the oleates or sulpholeates of the alkai metals. The disadvantages in this case, are that the affinity to the soluble substance is but slight, so that the resulting solutions are not at all stable, emulsify for the most part, crystallize out easily, are very susceptible to differences of temperature and precipitate freely in the water solution. Moreover, the percentages obtained are very low.

These disadvantages are obviated by the process hereinafter described. If camphor or cresols, terpenes, salol, naphthalene, and derivatives are dissolved in an oil by heating, or if by reason of the limited solvent capacity of the oil they are converted into a pulpy condition, permitted to cool and then acted upon slowly by concentrated sulphuric acid, a more or less dark solution in oil will result. This solution is left for some time in the cold to the action of the sulphuric acid and the excess of the same is then washed out by means of pure water or of salt water until a neutral reaction is obtained. If great importance is attached to the transparency of the product complete clearness even may be attained by the addition of some alkali the clarification being enhanced by adding to the product some protective colloids, such as vegetable gums, resins, dextrine, glue, proteins etc. Dependent upon the quantity of disinfectant initially placed in the oil, the product will then contain up to 70% and more of the disinfectant, the latter being in a highly dispersed condition, which will continue even after dilution with water. The bactericidal effect of the sulpho group is known, as well as its harmlessness in the circulation of the blood. By means of the process described above it is possible, therefore, to increase essentially the bactericidal effect of say a thymol preparation without loading it with other substances and to bring it, at the same time, into a water soluble state by which the production of water soluble disinfectants of high value is made possible.

*Example.*—100 grammes of chlorothymol are heated with 100 grammes of olive oil until a smooth paste is obtained, then the mixture is cooled down to about 20 degrees C. and 60 grammes of concentrated sulphuric acid are added the mixture being agitated and kept cool, so that the temperature does not exceed 45 degrees C. The resulting solution is allowed to stand for 2 days and is then washed with a concentrated sulphate of soda solution.

The products thus obtained may be reduced to solid form by absorbing the liquid in dry neutral media such as sugar.

The term "fatty oils" is herein used as a convenient generic description for the class of oils of the type obviously embraced by the disclosures herein, such as olive oil, castor oil, etc., which are susceptible of sulphonation by the usual means, as distinguished from mineral oils. Similarly, the materials which are to be dissolved in these "fatty oils", according to the disclosure of the instant process, will be referred to generically as "aromatic compounds, of the classes described, possessing inherent bactericidal properties, and which are soluble in fatty oils, but which are insoluble, or but sparingly soluble, in water".

Having now particularly described and ascertained the nature of this invention and in what manner the same it to be performed, I declare that what I claim is:

1. The herein described process of making water-soluble disinfectants, consisting of dissolving in fatty oils, aromatic compounds, possessing inherent bactericidal properties, and which are soluble in such fatty oils, but insoluble, or but sparingly soluble, in water; adding concentrated sulphuric acid to such oil solution under conditions of reduced temperature, and permitting the action of the acid to continue until the solvent oil has become substantially sulphonated; and thereafter substantially removing the excess of acid by washing.

2. In a process of making water-soluble disinfectants the steps of first dissolving substantially water-insoluble aromatic bactericidal compounds in a fatty oil, and subsequently sulphonating the solution.

3. The herein described process of making water-soluble disinfectants, consisting of dissolving cresols, in fatty oils; adding concentrated sulphuric acid to such oil solution under conditions of reduced temperature, and permitting the action of the acid to continue until the solvent oil has become substantially sulphonated; and thereafter substantially removing the excess of acid by washing.

4. The herein described process of making water-soluble disinfectants, consisting of dissolving thymol in fatty oils; adding concentrated sulphuric acid to such oil solution under conditions of reduced temperature, and permitting the action of the acid to continue until the solvent oil has become substantially sulphonated; and thereafter substantially removing the excess of acid by washing.

5. The herein described process of making water-soluble disinfectants, consisting of dissolving chlor-thymol in fatty oils; adding concentrated sulphuric acid to such oil solution under conditions of reduced temperature, and permitting the action of the acid to continue until the solvent oil has become substantially sulphonated; and thereafter substantially removing the excess of acid by washing.

6. The herein described process of making a water-soluble preparation of chlor-thymol, consisting of mixing chlor-thymol with a fatty oil, heating until a smooth paste is obtained; cooling the mixture to about 20° C.; adding an excess of concentrated sulphuric acid, agitating the mixture, and maintaining a temperature not substantially in excess of about 45° C.; allowing the resulting mass to stand for several days, and then washing out the excess acid by appropriate means.

7. A water-soluble disinfectant comprising a sulphonated solution of a fatty oil and an aromatic compound which possesses inherent bactericidal properties, insoluble, or only sparingly soluble, in water, but soluble in the said fatty oil; the said aromatic bactericidal compound being present in the sulphonated solution in a highly dispersed condition which continues after dilution in water with the formation of a substantially transparent and stable colloidal solution.

8. A water-soluble disinfectant comprising a sulphonated solution of fatty oil and cresol; the said cresol being present in the sulphonated solution in a highly dispersed condition which continues after dilution in water with the formation of a substantially transparent and stable colloidal solution.

9. A water-soluble disinfectant comprising a sulphonated solution of fatty oil and chlor-thymol; the chlor-thymol being present in the sulphonated solution in a highly dispersed condition which continues after dilution in water with the formation of a substantially transparent and stable colloidal solution.

PAUL GÖDRICH.